(12) United States Patent
Rousseau et al.

(10) Patent No.: US 8,733,071 B2
(45) Date of Patent: May 27, 2014

(54) PACKAGING AND DE-PACKAGING METHODS USING SHAPE MEMORY POLYMERS

(75) Inventors: Ingrid A. Rousseau, Clinton Township, MI (US); John N. Owens, Franklin, MI (US); Elisabeth J. Berger, Farmington Hills, MI (US); Hamid G. Kia, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 92 days.

(21) Appl. No.: 13/307,494

(22) Filed: Nov. 30, 2011

(65) Prior Publication Data
US 2012/0102897 A1    May 3, 2012

Related U.S. Application Data

(62) Division of application No. 12/471,820, filed on May 26, 2009, now abandoned.

(51) Int. Cl.
*B65B 43/00* (2006.01)
*B65B 47/00* (2006.01)
(52) U.S. Cl.
USPC ............................................. 53/453; 53/492
(58) Field of Classification Search
USPC ........... 53/396, 433, 452, 453, 461, 558, 574, 53/509; 264/101, 237
See application file for complete search history.

(56) References Cited

U.S. PATENT DOCUMENTS

| | | | |
|---|---|---|---|
| 3,718,019 A | 2/1973 | Box et al. | |
| 4,321,781 A | 3/1982 | Hall | |
| 4,730,726 A | 3/1988 | Holzwarth | |
| 5,307,934 A | 5/1994 | Hagner | |
| 5,487,484 A | 1/1996 | Bonniau et al. | |
| 6,160,084 A * | 12/2000 | Langer et al. | 528/272 |
| 6,594,971 B1 | 7/2003 | Addy et al. | |
| 8,038,923 B2 * | 10/2011 | Berger et al. | 264/313 |
| 2001/0000373 A1 | 4/2001 | Beck | |
| 2008/0315466 A1 | 12/2008 | Hood et al. | |
| 2009/0092807 A1 | 4/2009 | Hu et al. | |
| 2009/0206405 A1 | 8/2009 | Doyle et al. | |
| 2013/0018111 A1 * | 1/2013 | Loh et al. | 514/772.7 |

* cited by examiner

*Primary Examiner* — Stephen F Gerrity
(74) *Attorney, Agent, or Firm* — Dierker & Associates, P.C.

(57) ABSTRACT

A method disclosed herein includes packaging and de-packaging a part. The part is packaged by placing the part adjacent to a shape memory polymer (SMP) while the SMP is in a permanent shape. The SMP is heated to a temperature above a switching temperature of the SMP, and a force is applied to the heated SMP such that it conforms to i) a shape of the part and/or ii) a desired shape for packing the part, thereby changing the SMP from the permanent shape into a temporary shape. The SMP is cooled to a temperature below the switching temperature to set the SMP into the temporary shape. The part is de-packaged by heating the SMP to a temperature above its switching temperature, thereby reverting the SMP from the temporary shape into the permanent shape and releasing the part. The part is removed from the SMP in the permanent shape.

10 Claims, 6 Drawing Sheets

FIG. 2A

↓ PACKAGING

FIG. 2B

↓ DE-PACKAGING

↓ PACKAGING

FIG. 3B

↓ DE-PACKAGING

PACKAGING AND DE-PACKAGING METHODS USING SHAPE MEMORY POLYMERS

CROSS REFERENCE TO RELATED APPLICATION

This application is a divisional of U.S. patent application Ser. No. 12/471,820, filed May 26, 2009 now abandoned, the contents of which is incorporated herein by reference in its entirety.

TECHNICAL FIELD

The present disclosure relates generally to packaging and de-packaging methods using shape memory polymers.

BACKGROUND

Current packaging techniques typically involve wrapping a part with a suitable primary packaging material. For example, a typical packaging technique is the thermoforming of a packaging polymer (e.g., polyethylene) into a shape closely matching that of the part to be packaged. Removal of the part from such packaging is often accomplished by tearing off or cutting the packaging material, which may be difficult or require sharp removal tools.

SUMMARY

A method includes packaging a part by placing a part adjacent to a shape memory polymer while the shape memory polymer is in a permanent shape, heating the shape memory polymer in the permanent shape to a temperature above a switching temperature of the shape memory polymer, and applying a force to the heated shape memory polymer such that it conforms to at least one of i) a shape of the part, or ii) a desired shape for packaging the part, thereby changing the shape memory polymer from the permanent shape into a temporary shape. The packaging of the part further includes cooling the shape memory polymer to a temperature below the switching temperature to set the shape memory polymer into the temporary shape. The method further includes de-packaging the part by heating the shape memory polymer to a temperature above the switching temperature, thereby reverting the shape memory polymer from the temporary shape into a permanent shape, and releasing the part, and removing the part from the shape memory polymer in the permanent shape.

BRIEF DESCRIPTION OF THE DRAWINGS

Features and advantages of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Embodiment(s) of the method, as disclosed herein, may be used to suitably package a part, where such packaging advantageously protects the part from various environmental effects including, e.g., vibration, temperature, humidity, moisture, corrosive materials and/or chemicals, and/or the like. In some instances, the packaging also protects the part from theft or other similar undesirable (and potentially unlawful) occurrences. The methods disclosed herein may also advantageously enable de-packaging of the part, whereby upon removal of the part from the packaging material, the packaging material may be reused for the same part (such as, e.g., if the part requires re-packaging to return the part to the vendor, the manufacturer, or after appropriate recycling by the consumer or manufacturer for packaging of similar sized (e.g., when the temporary shape takes on the part shape) or identical (e.g., when the permanent shape is the part shape) future manufactured parts, or the like). The de-packaging of the part may also be accomplished relatively quickly in a relatively easy manner as such methods generally do not require the use of additional tools (e.g., box cutter, scissors, etc.). As such, the de-packaging methods disclosed herein are generally easier, and in some instances may involve less risk of damage to both the consumer and to the part, than conventional de-packaging methods.

The term "part" as used herein refers to any type of good for which packaging is desired and/or necessary. The part may include food or pharmaceutical items, manufactured items (e.g., automobile parts, clothing, toys, household items, cosmetics, medical equipment, electronics etc.), boxes and or other materials for shipping such items, or the like.

Various examples of the packaging and de-packaging method utilizing a shape memory polymer with the packaged part shape as the temporary shape are disclosed herein in conjunction with the FIGS. 1, 2, 3, 4 and 5 series. Each of these examples uses a shape memory polymer (alone or in conjunction with another non-shape memory material (e.g., a conventional polymer, paper, fabric, metal, etc.)) as a packaging material. As used herein, the term "packaging material" refers to a shape memory material (used alone or in conjunction with another non-shape memory material) that may be used to enclose or protect the part during distribution, storage, sale, shipment, and/or the like. As previously mentioned, in some examples, such as shown in the FIG. 1 series, the packaging material is formed completely from the shape memory polymer. Also as previously mentioned, in other examples, such as shown in the FIG. 2 through 5 series, the packaging material is formed from a combination of the shape memory polymer and the non-shape memory material. In these examples, the packaging material is a composite polymer in which portions are made up of the shape memory polymer and other portions are made up of the non-shape memory polymer.

Another example of the packaging and de-packaging method utilizing a shape memory polymer with the packaged part shape as the permanent shape is disclosed herein in conjunction with the FIG. 6 series.

The shape memory polymer for use as the packaging material will be identified herein in conjunction with the figures by reference numeral 10. The shape memory polymer 10 is generally deformable from a permanent shape (identified by reference numeral 10') to a temporary shape (identified by reference numeral 10"), and vice versa. The permanent shape 10' of the shape memory polymer 10 refers to a memorized shape of the polymer 10. The temporary shape 10" of the shape memory polymer 10 refers to a deformed, non-memorized shape of the polymer 10. In some instances, the temporary shape 10" conforms to the shape of the part (designated reference numeral 12 in the figures) to be packaged. In these instances, the permanent shape 10' of the shape memory polymer 10 is also generally more open than the temporary shape 10", especially in instances in which the entire packaging material consists of the shape memory polymer 10. In other instances, the permanent shape 10' conforms to the shape of the part 12 to be packaged. In these instances, the temporary shape 10" of the shape memory polymer 10 is also generally more open than the permanent shape 10', especially in instances in which the entire packaging material consists of the shape memory polymer 10. As used herein, the phrase "more open" refers to an expanded version of the shape memory polymer 10 when compared to the temporary shape 10". As one example, if the permanent shape 10' is a circular shape having a predetermined diameter, it is "more open" than the temporary shape 10" when the temporary shape 10" has a similar circular shape with a smaller diameter than the predetermined diameter for the permanent shape 10'. The deforming of the shape memory polymer 10 will be described in further detail below.

Prior to actually packaging a part 12, the shape memory polymer 10 is originally formed into a shape sufficient for packaging the part 12, where such shape is memorized by the shape memory polymer 10. To reiterate from above, the memorized shape is referred to herein as the permanent shape 10' of the shape memory polymer 10. The permanent shape 10' of the shape memory polymer 10 may be any shape that is more open than a shape of the part 12. A non-limiting example of such a permanent shape 10' is a flat shape, as shown in FIGS. 1A, 2A, 3A, 4A and 5A. It is to be understood, however, that other shapes may also be used for the permanent shape 10', such as, e.g., a curved shape (convex or concave), a parallelepiped shape, and/or the like. These other shapes, if used as the permanent shape 10', generally include an opened portion so that the part 12 may be placed inside prior to packaging and may be removed upon de-packaging.

Forming the shape memory polymer 10 into its permanent shape 10' may be accomplished following traditional techniques, such as polymer casting, extrusion, injection molding, etc. Thermoplastic-based shape memory polymers are formed (and shaped) above their highest melting temperature, and are subsequently cooled for use. Thermoset-based shape memory polymers require that the reactants be mixed and shaped concurrently with being heated to a predetermined curing temperature to allow for setting of the permanent shape 10' of the shape memory polymer 10 and for creation of covalent bonds. If it is desired, thermoplastic-based shape memory polymers (such as polyolefin-based polymers) could also be made as thermoset-based shape memory polymers with covalent crosslinking by exposing the polymer to e-beam irradiation following the initial heating/shaping/cooling stage or by adding adequate crosslinkable functionalities to the initial reactant mixture.

The shape memory polymer 10 may be a thermoplastic polymer or a thermoset polymer. If the shape memory polymer 10 is a thermoplastic polymer, the recovery of the permanent shape 10' is enabled by physical cross-links present in the polymeric structure. If the shape memory polymer 10 is a thermoset polymer, the recovery of the permanent shape 10' is enabled by the covalent cross-links. In either case, the presence of physical or covalent cross-links provides the elastic energy necessary for the reversion of the shape memory polymer 10 from another shape (e.g., a temporary shape 10" as described in further detail below) to its permanent shape 10' by releasing the stored energy imparted to the system during the deformation at a suitable temperature and subsequent cooling to set a temporary shape 10".

Figure 1A:
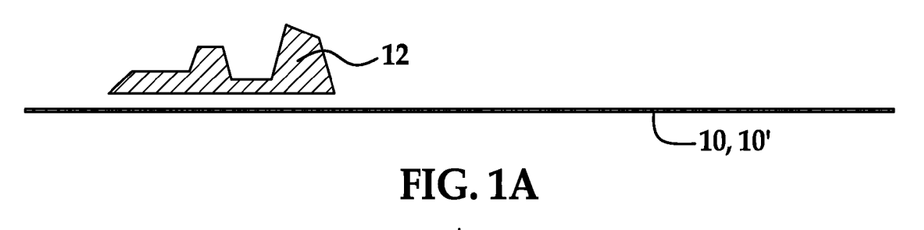
FIGS. 1A through 1C together schematically depict an example of a packaging and de-packaging method.

Referring now to the example of the packaging method depicted in the FIG. 1 series, the method includes placing the part 12 adjacent to the shape memory polymer 10 in its permanent shape 10'. As shown in FIG. 1A, the part 12 is placed against the shape memory polymer 10, 10'. In another example, the shape memory polymer 10, 10' may be placed over the part 12. In any event, the placement of the part 12 may be made in/on any desirable location of the shape memory polymer 10, 10'. As shown in FIG. 1A, the part 12 is placed toward the middle of the flat-shaped shape memory polymer 10, 10'. In another example, the part 12 may be placed closer to one of the ends of the shape memory polymer 10, 10'.

Depending on the placement of the part 12, at least one portion of the shape memory polymer 10, 10' is moved during the packaging process in order to drape the polymer 10, 10' over the entire periphery of the part 12, thereby surrounding the part 12 and/or conforming to the part 12 shape. If, for example, the part 12 is placed in the middle of the shape memory polymer 10, 10' (as shown in FIG. 1A), then the portion of the polymer 10, 10' located at each opposed end thereof is moved during packaging such that it conforms to the part 12 shape. If, on the other hand, the part 12 is placed on the shape memory polymer 10, 10' at one end thereof, then the portion of the polymer 10, 10' at the opposed end from where the part 12 is placed is moved during packaging such that it conforms to the part 12 shape.

In instances where the permanent shape 10' of the shape memory polymer 10 is curved, parallelepipedic, or some other similar, enclosed shape, the shape memory polymer 10, 10' may include an opened portion configured to receive the part 12 (not shown in the figures). Once the part 12 is placed inside the polymer 10, 10', the polymer 10, 10' substantially surrounds the part 12, and thus the part 12 is adjacent to the shape memory polymer 10, 10'.

It is to be understood that, for any of the examples described above, although the shape memory polymer 10, 10' is adjacent to and in some instances substantially surrounds the part 12, the shape memory polymer 10 in its permanent shape 10' generally does not actually contact all surfaces of the part 12 (or does not effectively enclose/package the part 12). Such contact (or such effective enclosure, packaging, and/or protection which may not require actual contact) is accomplished when the shape memory polymer 10 is deformed into its temporary shape 10", which will now be described in detail in conjunction with FIG. 1B.

Figure 1B:
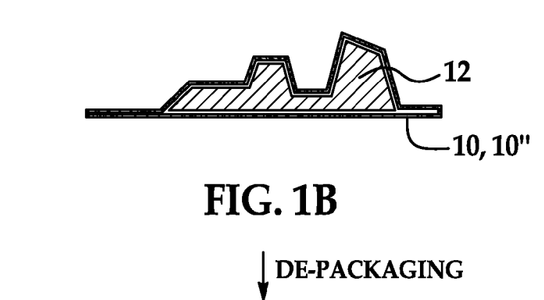

Referring to FIG. 1B, the shape memory polymer 10 is deformed from its permanent shape 10' into its temporary shape 10". In an example, the deforming is accomplished by heating the shape memory polymer 10 in its permanent shape 10' to a temperature above its switching temperature. As used herein, the "switching temperature" of the shape memory polymer 10 refers to the temperature at which the shape memory polymer 10 becomes substantially easily deformable and, in combination with a force (as will be described in further detail below), may be switched from its permanent shape 10' into its temporary shape 10". The switching temperature also refers to the temperature at which the shape memory polymer reaches its low modulus state and may spontaneously revert from its temporary shape 10" back into its permanent shape 10' (which will also be described in further detail hereinbelow).

It is to be understood that the switching temperature varies depending on the chemistry of the shape memory polymer 10 selected. It is to be further understood that the switching temperature will also depend, at least in part, on the storage temperature requirements for the packaged goods (e.g., part 12). Additionally, because the reversion of the shape memory polymer 10 to the more open shape will occur relatively quickly (within seconds) upon heating, the undesirable effect of local heating on the good may not deleteriously affect the product function or viability. As such, the selection of the polymer 10 (and thus the switching temperature) will depend upon each particular product to be packaged. For example, for electronics, typical storage temperature requirements are <50° C., and thus a switching temperature of that order would require actual heating to about 60° C. or 70° C. for a time ranging from a few tens of seconds to a few minutes. As another example, food products may or may not require refrigeration, and thus the switching temperatures may range from 40° C. to 50° C., or from below freezing temperature (e.g., −30° C.) up to room temperature (e.g., about 30° C.) for frozen or refrigerated products. Similarly, some medical equipment requires storage at about or close to room temperature, and thus suitable switching temperatures for the shape memory polymer 10 packaging may range from 40° C. to 50° C. (requiring heating from 50° C. to 60° C. or even up to 70° C.). Since some materials may not be viable if heated for a few seconds, and others may be viable with such heating, one will (and in some instances must) select the polymer 10 based upon the product to be packaged, and the properties of the polymer 10. In a non-limiting example, the switching temperature of the shape memory polymer 10 ranges from about room temperature (e.g., about 30° C.), or below if required, to about 160° C. for acrylate or polyolefin based shape memory polymers 10. In non-limiting examples, polyethylene and polypropylene-based shape memory polymers 10 would preferentially allow for switching temperatures ranging from about 120° C. to about 160° C., whereas the switching temperature for ethylene propylene-diene (EPDM)-based or acrylate-based shape memory polymers could respectively span over a temperature range from 40° C. to about 70° C. or from below room temperature to about 115° C.

Non-limiting examples of suitable shape memory polymers 10 for the packaging material include olefin-based systems, acrylate-based systems, styrene-based systems, polyester-based systems, acrylonitrile-butadiene-styrene-based blends, or epoxy-based systems. Such materials may also include fillers (e.g., inorganic fillers) or other active materials (such as, e.g., shape memory alloy wires, magneto-responsive fillers, electroactive fillers, photo-responsive organic dyes, and/or the like). It is to be understood that fillers may be reinforcing fillers (which improve the mechanical properties of the shape memory polymer 10), active fillers such as, e.g., magnetic or electrically conductive particles (which may contribute to the triggering mechanism for the shape memory effect), or active fillers that may contribute to improvement of other physical properties of the shape memory polymer such as, e.g., its thermal conductivity. Also, the shape memory polymers 10 may include other additives, such as UV blockers, plasticizers, colorant dyes, or other additives suitable for a particular application.

It is to be understood that when the shape memory polymer 10 is heated to deform the polymer 10 from the permanent shape 10' to the temporary shape 10", such heating should not melt or degrade the shape memory polymer 10, or otherwise deteriorate the operability and/or functionality of the part 12. Accordingly, the heating of the shape memory polymer 10 may be accomplished at a temperature above the switching temperature of the polymer 10, but below at least a melting or degradation temperature of the part 12 or a component of the part 12 having the lowest melting or degradation temperature of all the part components. In instances where the part 12 is sensitive to temperature, the selection of the shape memory polymer 10 will be such that the temperature at which the shape memory polymer 10 is heated to switch it to/from its permanent shape to its temporary shape does not deleteriously affect and thus accommodates such temperature sensitivity.

In addition to heating the shape memory polymer 10 to change it from its permanent shape 10' to its temporary shape 10", a force is applied to the polymer 10 to conform the shape memory polymer 10 to the part 12 shape. In some instances, the heat and the force is applied sequentially, and in other instances, the heat and the force is applied substantially simultaneously.

In an example, the shape memory polymer 10 may be heated and thereafter pressurized (in a manner similar to a blister line) in order to conform the polymer 10 to the part 12 shape. For instance, the shape memory polymer 10 may be heated to a temperature above its switching temperature and then be introduced into a forming station. In the forming station, the shape memory polymer 10 is placed on the part 12 and a pressure differential is applied across the shape memory polymer plane such that it conforms against the exterior of the part 12. The pressure differential may be accomplished by applying pressure on one side of the shape memory polymer 10, or by applying pressure to a side of the shape memory polymer 10 furthest from the part 12 and pulling a vacuum from the side of the shape memory polymer 10 facing the part 12, or by alone pulling a vacuum from the side of the shape memory polymer 10 facing the part 12. In a non-limiting example, the amount of pressure applied to the shape memory polymer 10 ranges from about 4 bars to about 8 bars. It is to be understood that the shape memory polymer 10 is effectively stretched onto the part 12 via the force from the pressure and/or vacuum which is sufficient to deform the heated shape memory polymer 10 into its temporary shape 10".

Once the shape memory polymer 10 has been changed from its permanent shape 10' into its temporary shape 10", the temporary shape 10" of the shape memory polymer 10 may be fixed or set by cooling the shape memory polymer 10, 10" to a temperature below its switching temperature. In some instances, cooling may be accomplished by removing the heat and allowing the shape memory polymer 10 to reach room temperature. In other instances, the shape memory polymer 10 may be cooled more rapidly by air cooling, liquid nitrogen cooling, or other suitable means. It is to be understood that any temperature below the switching temperature will suffice to set the shape memory polymer 10 into the temporary shape 10", including temperatures above or below room temperature. In a non-limiting example, the shape memory polymer 10, 10" is desirably cooled to a temperature ranging from about at least 10° C. to about 20° C. below its switching temperature.

Figure 1C:
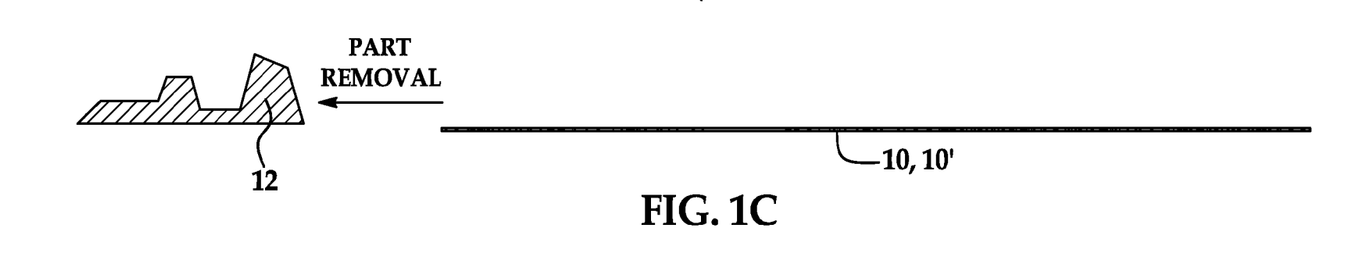

Referring now to FIG. 1C, the method may further include de-packaging the part 12 after the part 12 has been packaged. In an example, de-packaging may be accomplished by heating the shape memory polymer 10 in its temporary shape 10"

to a temperature above its switching temperature. When the shape memory polymer 10, 10" is heated to this temperature, the polymer 10, 10" reaches its low modulus and deformable state and reverts back to its permanent shape 10'. It is to be understood that because the reversion of the shape memory polymer 10 from its temporary shape 10" back into its permanent shape 10' is due, at least in part, to stored energy within the polymer network, a force is generally not required to complete the reversion.

The reverting of the shape memory polymer 10 from its temporary shape 10" back into its permanent shape 10' opens up the shape memory polymer 10 thereby releasing the part 12. Such releasing of the part 12 generally enables quick and relatively safe removal of the part 12 from the shape memory polymer 10 packaging. The part 12 is thereafter removed from the packaging.

Other examples of the packaging method are schematically depicted in the FIGS. 2, 3, 4, and 5 series. In these examples, the packaging material is a composite of a shape memory polymer 10 and a non-shape memory material (identified by reference numeral 16). The non-shape memory material 16 (as denoted by its name) is a material not having shape memory characteristics. Non-limiting examples of suitable non-shape memory materials include metals, paper, cardboard, non-shape memory polymers (e.g., polyolefins, such as polyethylene terephthalate (PET), polyethylene terephthalate ethylene (PETE), polypropylene (PP), etc.), a ceramic, a glass, or combinations thereof. Depending upon the purpose for the packaging and the part 12 to be packaged, non-shape memory polymers may be the most desirable material for the non-shape memory material 16.

Figure 2A:
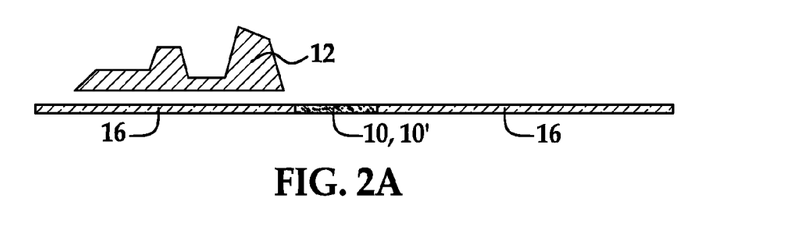
FIGS. 2A through 2C together schematically depict another example of a packaging and de-packaging method.
Figure 2B:
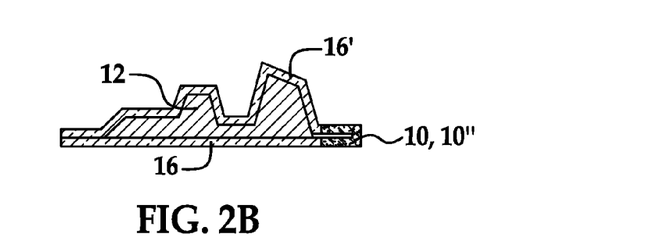

In the example shown in the FIG. 2 series, the part 12 is placed on the packaging material including the shape memory polymer 10 in its permanent shape 10' integrated with the non-shape memory material 16. As shown in FIG. 2A, the shape memory polymer 10, 10' is located between two portions of the non-shape memory material 16. In the example shown in the FIG. 3 series, on the other hand, the shape memory polymer 10, 10' is located at an end 18 of the non-shape memory material 16. In either example, the shape memory polymer 10 (when in its temporary shape 10") and the non-shape memory material 16 together conform to the part 12 shape, as will be described in detail below in conjunction with FIGS. 2B and 3B. It is to be understood that the examples shown in the FIGS. 2 and 3 series are illustrative, and that the shape memory material 10 may be integrated with the non-shape memory material 16 in any desirable manner that enables the part 12 to be packaged and de-packaged in a desirable manner. Other such examples are discussed further hereinbelow in reference to the FIGS. 4 and 5 series.

Referring now to the example of the method depicted in the FIG. 2 series, the part 12 is placed against one of the portions of the non-shape memory material 16 (as shown in FIG. 2A). It is to be understood that in this example the part 12 is not placed against a portion of the shape memory polymer 10, 10' so that the part 12 does not restrict any movement of the shape memory polymer 10, 10' when it changes shape. As such, in this example, the shape memory polymer 10 acts as a hinge of the packaging material.

As shown in FIG. 2B, the shape memory polymer 10 is deformed from its permanent shape 10' into a temporary shape 10" by heating the shape memory polymer 10, 10' to a temperature above its switching temperature and applying a suitable force to the polymer 10, 10'. The heating and the application of the force may be accomplished according to the methods described hereinabove in conjunction with the FIG. 1 series. When the heat is applied to change the shape memory polymer 10 into its temporary shape 10", the non-shape memory material 16 is thermoformed or otherwise deformed such that it generally complies with such movement and conforms to the part shape 12 as a result of traditional plastic deformation. Examples of such thermoforming/deforming methods include heating and pressurizing (e.g., via the blister line method described above), vacuum forming (as also described above), or other deforming methods. The temporary shape 10" of the shape memory polymer 10 and the deforming and/or thermoforming of the non-shape memory material 16 enable the packaging, as a whole, to surround the part 12. For example, as shown in FIG. 2B, a portion of the deformed/thermoformed non-shape memory material 16' folds over a portion of the part 12, and together the deformed/thermoformed non-shape memory material 16' and the shape memory polymer 10 in its temporary shape 10" surround the part 12.

The shape memory polymer 10 is then cooled to a temperature below its switching temperature to set the polymer 10 in its temporary shape 10". It is to be understood that after deforming/thermoforming, the whole material is cooled to below the softening/melting temperature of the non-shape memory polymer 16', so the switching temperature of the shape memory polymer 10 is set to be lower than that of the deforming or thermoforming operation.

Figure 2C:
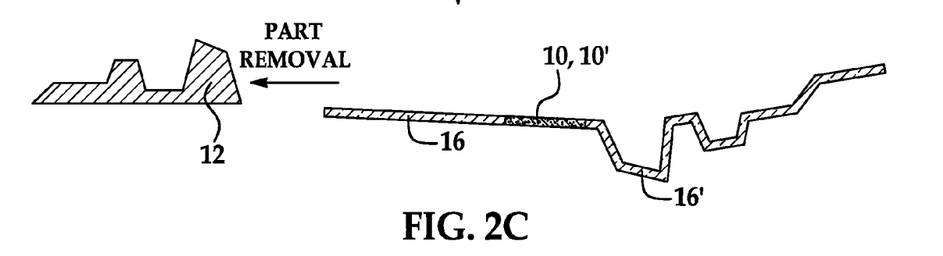

Referring now to FIG. 2C, the part 12 may be de-packaged by heating the shape memory polymer 10 in its temporary shape 10" to a temperature above its switching temperature. When the shape memory polymer 10, 10" is heated to this temperature, the polymer 10, 10" again reaches its low modulus and deformable state and reverts back to its permanent shape 10'. The reverting of the shape memory polymer 10, 10' forces at least one of the two portions of the previously deformed/thermoformed non-shape memory material 16' to move away from each other, thereby opening up the packaging and allowing the part 12 to be removed therefrom. As shown in FIG. 2C, the deformed and/or thermoformed non-shape memory material 16' may retain the part 12 shape, depending upon the material used.

Figure 3A:
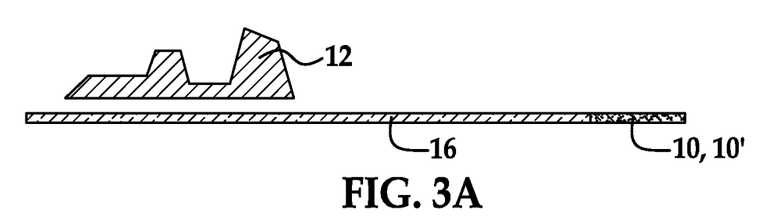
FIGS. 3A through 3C together schematically depict yet another example of a packaging and de-packaging method.
Figure 3B:
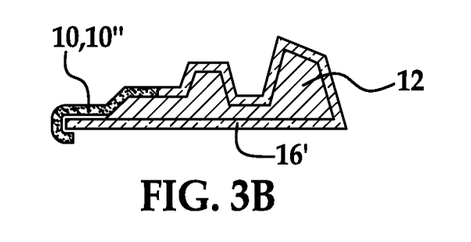

Referring now to the example depicted in the FIG. 3 series (where the shape memory polymer 10 in its permanent shape 10' is located at the end 18 of the non-shape memory material 16, as shown in FIG. 3A), the method includes deforming/thermoforming the non-shape memory material 16 so that the deformed and/or thermoformed non-shape memory material 16' substantially surrounds the part 12 (shown in FIG. 3B). Prior to or during deforming/thermoforming of the non-shape memory material 16, the shape memory polymer 10 is deformed from its permanent shape 10' into its temporary shape 10" (also shown in FIG. 3B). If the shape memory polymer 10 is deformed prior to deforming/thermoforming, the deforming/thermoforming temperature is less than the switching temperature of the shape memory polymer 10. However, if the shape memory polymer 10 is deformed during deforming/thermoforming, the deforming/thermoforming temperature is greater than or equal to the switching temperature of the shape memory polymer 10. The switching may be accomplished by heating the shape memory polymer 10, 10' to a temperature above its switching temperature and applying an appropriate force thereto. Then the shape memory polymer 10, 10" is cooled to a temperature below its switching temperature in order to set the polymer 10 into its temporary shape 10". As shown in FIG. 3B, the temporary shape 10" of the shape memory polymer 10 in combination with the non-shape memory material 16 completes the packaging of the part 12.

Figure 3C:
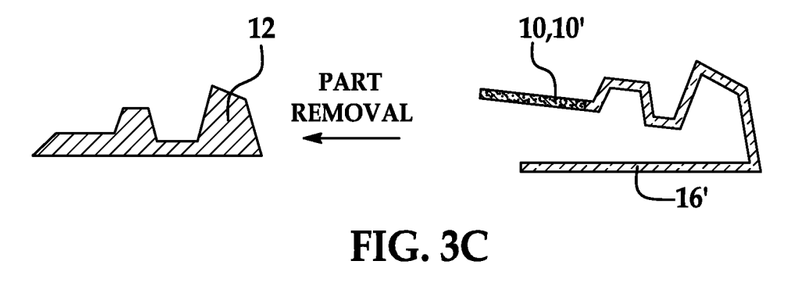

Referring now to FIG. 3C, the part 12 may be de-packaged by heating the shape memory polymer 10 in its temporary shape 10" to a temperature above its switching temperature. When the shape memory polymer 10, 10" is heated to this temperature, the polymer 10 again reverts back to its permanent shape 10'. When the polymer 10, 10' is reverted, the polymer 10, 10' separates from the non-shape memory material 16, opens up the packaging, and allows the part 12 to be removed therefrom.

As mentioned hereinabove, the FIGS. 4 and 5 series illustrate other embodiments of using a shape memory polymer 10 with a non-shape memory material 16.

Figure 4A:
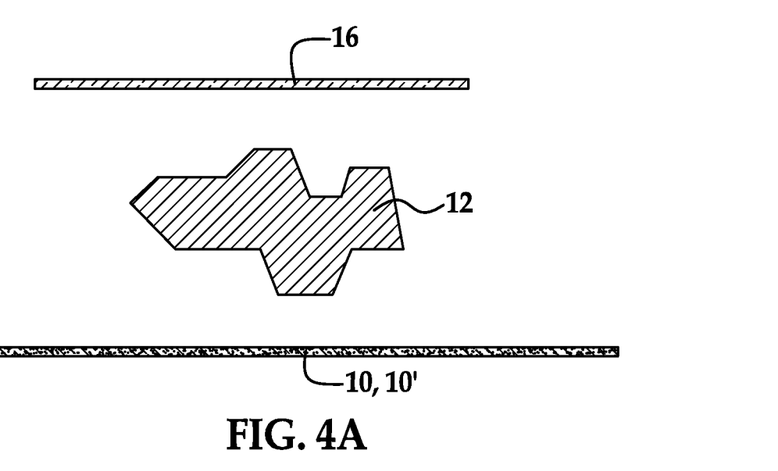
FIGS. 4A through 4C together schematically depict yet another example of a packaging and de-packaging method.
Figure 4B:
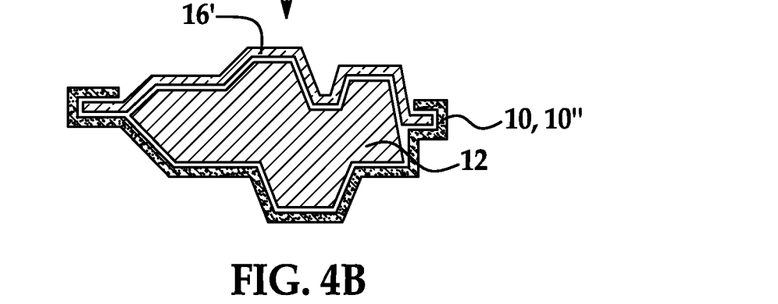

In the FIG. 4 series, the shape memory polymer 10 and the non-shape memory material 16 are two different pieces of the packaging material, as shown in FIG. 4A. The non-shape memory material 16 is thermoformed or otherwise deformed such that it generally conforms to a portion of the part shape 12 (as shown in FIG. 4B). The shape memory polymer 10 is then deformed from its permanent shape 10' into its temporary shape 10" such that it i) conforms to another portion of the part and ii) surrounds the end portions of the thermoformed/deformed non-shape memory material 16', thereby forming a crimp (also shown in FIG. 4B). The conversion of the shape memory polymer 10 may be accomplished by heating the shape memory polymer 10, 10' to a temperature above its switching temperature and applying an appropriate force thereto. Then the shape memory polymer 10, 10" is cooled to a temperature below its switching temperature in order to set the polymer 10 into its temporary shape 10".

Figure 4C:
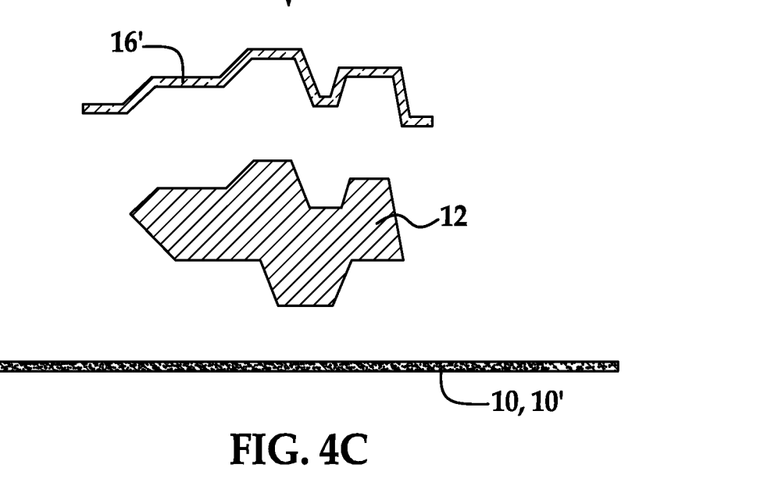

The de-packaging of the part 12 is shown in FIG. 4C. To reiterate from above, this may be accomplished by heating the shape memory polymer 10 in its temporary shape 10" to a temperature above its switching temperature. When the shape memory polymer 10, 10" is heated to this temperature, the polymer 10 again reverts back to its permanent shape 10', thereby opening up the crimp and enabling the previously thermoformed/deformed non-shape memory material 16' to be separated from the part 12.

Figure 5A:
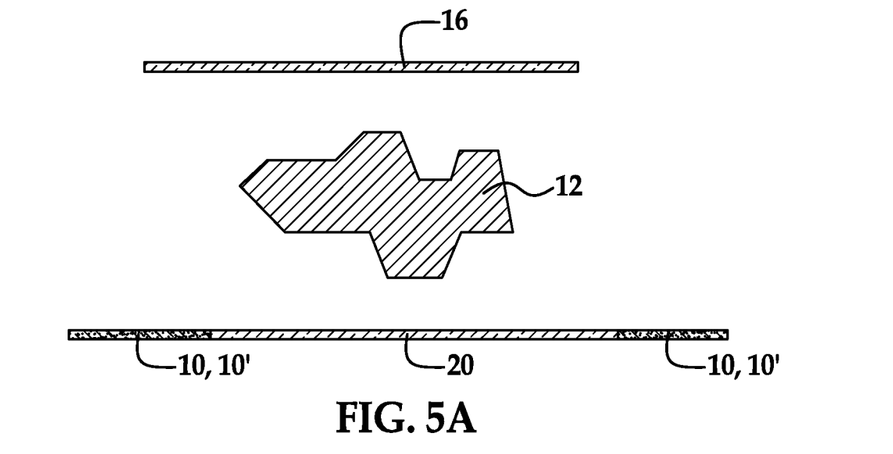
FIGS. 5A through 5C together schematically depict yet another example of a packaging and de-packaging method.
Figure 5B:
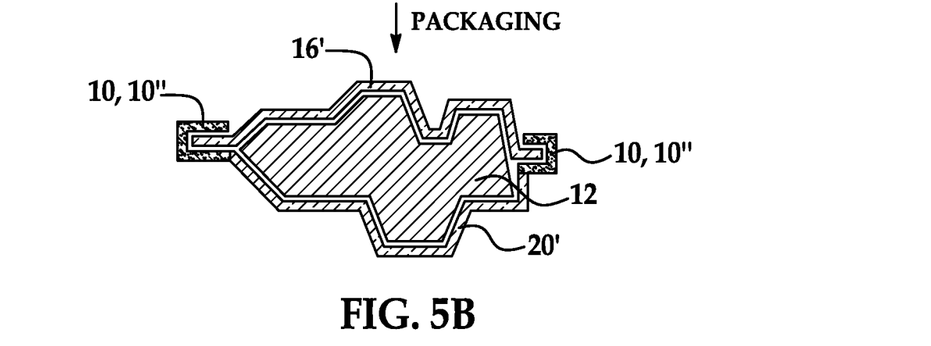

In the FIG. 5 series, two different pieces are used to form the packaging material (similar to FIGS. 4A through 4C). However, in this embodiment, a non-shape memory material 16 is one of the pieces, and the other of the pieces is a composite of the shape memory polymer 10 and another non-shape memory material 20 (shown in FIG. 5A). In this embodiment, the shape memory polymer 10 portions of the composite piece are located at the ends of the non-shape memory material 20.

The non-shape memory materials 16, 20 are thermoformed or otherwise deformed such that they generally conform to respective opposed portions of the part shape 12 (as shown in FIG. 4B). The shape memory polymer 10 portions are then deformed from their permanent shapes 10' into their temporary shapes 10" such that each shape memory polymer 10 in its temporary shape 10" surrounds one end portion of the thermoformed or deformed non-shape memory material 16', thereby forming a crimp (also shown in FIG. 4B). The conversion of the shape memory polymers 10 may be accomplished by heating the shape memory polymer 10, 10' to a temperature above its switching temperature and applying an appropriate force thereto. Then the shape memory polymer 10, 10" is cooled to a temperature below its switching temperature in order to set the polymer 10 into its temporary shape 10".

Figure 5C:
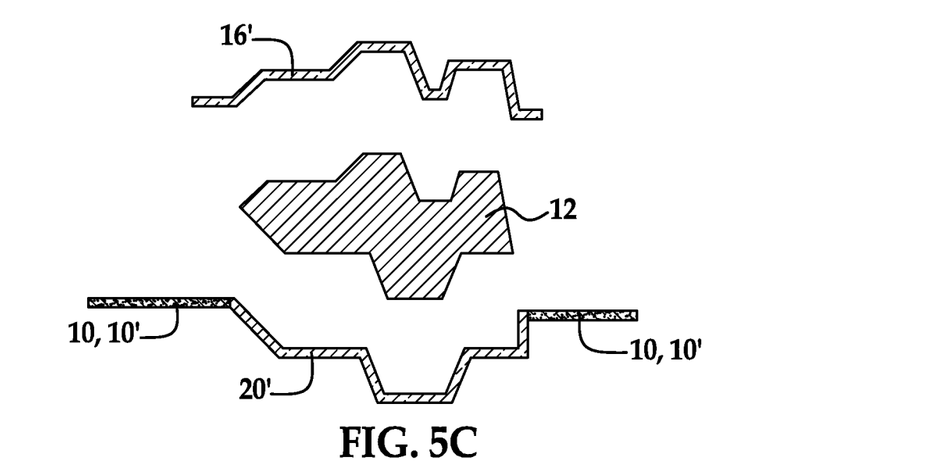

The de-packaging of the part 12 is shown in FIG. 5C. To reiterate from above, this may be accomplished by heating the shape memory polymer 10 in its temporary shape 10" to a temperature above its switching temperature. When the shape memory polymer 10, 10" is heated to this temperature, the polymer 10 again reverts back to its permanent shape 10', thereby opening up the crimp and enabling both of the previously deformed/thermoformed non-shape memory materials 16', 20' to be removed from the part 12.

It is to be understood that the embodiments depicted in the FIGS. 4 and 5 series may further be accomplished by reversing the shape memory polymer 10 and the non-shape memory material 16 (according to the embodiment depicted in the FIG. 4 series) or by reversing the shape memory polymer 10 composite and the non-shape memory material 16 (according to the embodiment depicted in the FIG. 5 series). For example, in the embodiment depicted in the FIG. 4 series, the non-shape memory material 16 may be used on the bottom portion of the part 12, and the shape memory polymer 10 may be used on the top portion of the part 12. The respective packaging materials may also be configured to surround the part 12 from its sides. It is further to be understood that the embodiment of the method shown in the FIG. 4 series may also be accomplished where both pieces are shape memory polymers. Likewise, the embodiment shown in the FIG. 5 series may also be accomplished where one piece is a shape memory polymer composite and the other piece is a shape memory polymer.

Referring now to FIGS. 6A through 6D, another embodiment of the packaging and de-packaging methods is shown. In this embodiment, the permanent shape 10' of the shape memory polymer 10 corresponds to the desired part 12 shape (shown in FIG. 6A), and the temporary shape 10" of the shape memory polymer 10 is the more open shape (shown in FIG. 6B).

When setting the permanent shape 10' of the shape memory polymer 10 as the part 12 shape, for thermoset materials, the shape in which the polymer is cured becomes the permanent shape 10'. For thermoplastic materials, the material is melted and shaped into the permanent shape 10' using conventional methods such as, e.g., injection molding, blow molding, and/or the like.

Figure 6A:
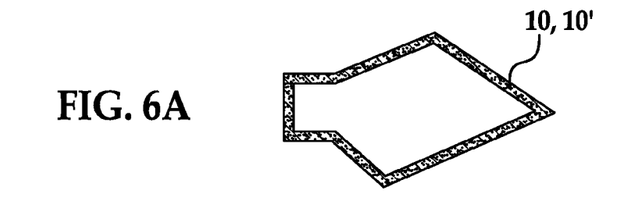
FIGS. 6A through 6D together schematically depict an example of still another packaging and de-packaging method.
Figure 6B:
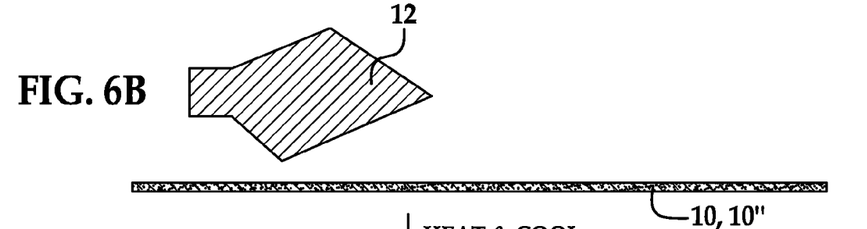

FIG. 6A shows the shape memory polymer 10 already set into the permanent shape 10'. In order to open the polymer 10 into a more open temporary shape 10", the shape memory polymer 10 is heated above its switching temperature. This heating generally enables the polymer 10 to reach its low modulus, easily deformable state, and the polymer 10 may then be deformed by applying some external force (such as those described hereinabove in reference to the other figures) to conform the polymer 10 to the more open temporary shape 10", as shown in FIG. 6B. The shape memory polymer 10 is then cooled to set the temporary shape 10" (the shape in which the shape memory polymer 10 is ready for packaging of the part 12).

FIG. 6B also illustrates the positioning of the part 12 proximate to the shape memory polymer 10 in its temporary shape 10". It is to be understood that the position of the part 12 is selected so that when the shape memory polymer 10 is converted back into its permanent shape 10', the polymer 10 will conform to the part 12 shape.

Figure 6C:
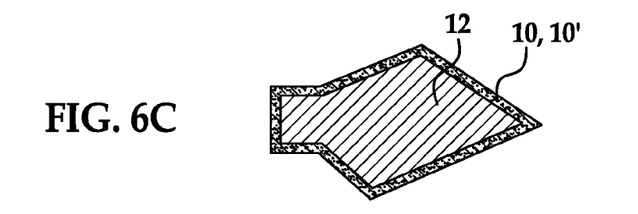

Once the part 12 is in a suitable position adjacent to the shape memory polymer 10, the shape memory polymer 10 is again heated above its switching temperature. This heating causes the shape memory polymer 10 to spontaneously revert to its permanent shape 10', thereby surrounding the part 12, as shown in FIG. 6C. The polymer 10 is then cooled below the switching temperature to set the permanent shape 10' around the part 12.

Figure 6D:
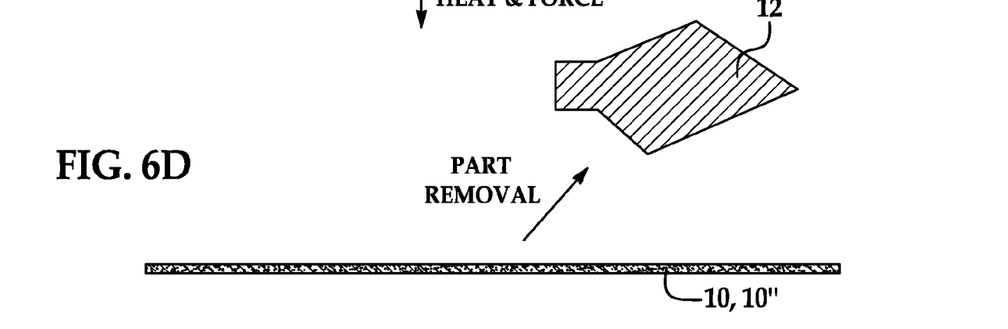

In order to de-package the part 12 in this embodiment, the shape memory polymer 10, 10' is again heated above its switching temperature. Upon reaching its low modulus state, the shape memory polymer 10' may be pulled off of the part 12. The pulling exerted on the shape memory polymer 10' may, in an example, be the external force required to deform the polymer 10 into, e.g., the temporary shape 10", as shown in FIG. 6D. It is to be understood that the polymer 10 may be deformed into any other shape (not necessarily the temporary shape 10" shown in FIG. 6D) that is sufficient for removal of the part 12. Once the temporary shape 10" is achieved, the part 12 may be separated from the polymer 10.

It is to be understood that since heating is and cooling is used to convert the polymer 10 between its two shapes 10', 10" while the part 12 is therein, the switching temperature is selected to be i) below a lowest melting temperature of the part 12, or ii) below a degradation temperature of the part 12, or iii) below a melting temperature of a component of the part 12 having a lowest melting temperature of all components of the part 12, or iv) below a degradation temperature of a component of the part 12 having a lowest degradation temperature of all components of the part 12. It is to be understood that all of the materials described hereinabove may be suitable for the shape memory polymer 10 described in FIGS. 6A through 6D.

The embodiment shown in FIGS. 6A through 6D may be particularly desirable when the packaging material 10 is to be used multiple times for the same part 12 shape. Since the permanent shape 10' of the shape memory polymer 10 is in the part 12 shape, each package may be opened, emptied, and the shape memory polymer 10 sent back to the manufacturer for reuse with the same type of part 12 with minimal work required to package the new part 12 using the shape memory polymer 10.

While several embodiments have been described in detail, it will be apparent to those skilled in the art that the disclosed embodiments may be modified. Therefore, the foregoing description is to be considered non-limiting.

The invention claimed is:

1. A method, comprising:
   packaging a part by:
   placing the part adjacent to a non-shape memory material having a shape memory polymer located at an end thereof, the non-shape memory material and the shape memory polymer forming a single layer, the shape memory polymer being in a permanent shape;
   heating the shape memory polymer in the permanent shape to a temperature above a switching temperature of the shape memory polymer;
   any of deforming or thermoforming the non-shape memory material such that it substantially surrounds the part;
   applying a force to the heated shape memory polymer such that it surrounds an other end of the any of deformed or thermoformed non-shape memory material to form a crimp, thereby changing the shape memory polymer from the permanent shape into a temporary shape; and
   cooling the shape memory polymer to a temperature below the switching temperature to set the shape memory polymer into the temporary shape; and
   de-packaging the part by:
   heating the shape memory polymer to a temperature above the switching temperature, thereby reverting the shape memory polymer from the temporary shape into the permanent shape, and separating the shape memory polymer from the other end of the any of the deformed or thermoformed non-shape memory material to open up the non-shape memory material and enable the part to be removed therefrom; and
   removing the part.

2. The method as defined in claim 1 wherein the any of the deforming or thermoforming is accomplished by heating and pressurizing the non-shape memory material, or vacuum forming the non-shape memory material around the part.

3. The method as defined in claim 1 wherein the permanent shape is straight, and wherein the temporary shape includes a non-straight portion.

4. The method as defined in claim 1 wherein the switching temperature ranges from −30° C. up to about 100° C.

5. The method as defined in claim 1 wherein the switching temperature is at least one of: i) below a melting temperature of the part, or ii) below a degradation temperature of the part, or iii) below a melting temperature of a component of the part having a lowest melting temperature of all components of the part, or iv) below a degradation temperature of a component of the part having a lowest degradation temperature of all components of the part.

6. The method as defined in claim 1 wherein the heating of the shape memory polymer takes place prior to the any of the deforming or thermoforming of the non-shape memory material, and wherein a deforming or thermoforming temperature is less than the switching temperature of the shape memory polymer.

7. The method as defined in claim 1 wherein the heating of the shape memory polymer is performed during the any of the deforming or thermoforming of the non-shape memory material, and wherein a deforming or thermoforming temperature is equal to or greater than the switching temperature of the shape memory polymer.

8. A de-packaging method, comprising:
   providing a part at least partially surrounded by a non-shape memory material having a shape memory polymer located at an end thereof, the shape memory polymer being in a temporary shape and forming a crimp around an other end of the non-shape memory material, the non-shape memory material and the shape memory polymer forming a single layer;
   heating the shape memory polymer to a temperature above a switching temperature of the shape memory polymer, thereby reverting the shape memory polymer from the temporary shape into a permanent shape and opening up the non-shape memory material; and
   removing the part from the non-shape memory material.

9. The method as defined in claim 8 wherein the switching temperature ranges from −30° C. up to about 100° C.

10. The method as defined in claim 8 wherein the switching temperature is at least one of: i) below a melting temperature of the part, or ii) below a degradation temperature of the part, or iii) below a melting temperature of a component of the part having a lowest melting temperature of all components of the par, or iv) below a degradation temperature of a component of the part having a lowest degradation temperature of all components of the part.

* * * * *